US010585686B2

(12) United States Patent
Saurabh (10) Patent No.: US 10,585,686 B2
(45) Date of Patent: Mar. 10, 2020

(54) CONTEXT AWARE GUIDED SCENARIOS

(71) Applicant: Microsoft Technology Licensing, LLC, Redmond, WA (US)

(72) Inventor: Saket Saurabh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 15/639,101

(22) Filed: Jun. 30, 2017

(65) Prior Publication Data

US 2018/0189079 A1    Jul. 5, 2018

(30) Foreign Application Priority Data

Jan. 2, 2017 (IN) .............................. 201741000144

(51) Int. Cl.
*G06F 9/451* (2018.01)
*G06F 3/0482* (2013.01)
*G06F 8/34* (2018.01)

(52) U.S. Cl.
CPC ............ *G06F 9/453* (2018.02); *G06F 3/0482* (2013.01); *G06F 8/34* (2013.01)

(58) Field of Classification Search
CPC ..................................................... G06F 17/00
See application file for complete search history.

(56) References Cited

U.S. PATENT DOCUMENTS

| | | | |
|---|---|---|---|
| 6,687,485 B2 | 2/2004 | Hopkins et al. | |
| 6,690,390 B1 | 2/2004 | Walters et al. | |
| 7,596,754 B2 | 9/2009 | Wessling et al. | |
| 8,386,931 B2 | 2/2013 | Guckenheimer | |
| 9,063,757 B2 | 6/2015 | Horton et al. | |
| 9,361,389 B2 | 6/2016 | Ames et al. | |
| 9,449,524 B2 | 9/2016 | Bruce et al. | |
| 2004/0157202 A1 | 8/2004 | Hopkins et al. | |
| 2009/0300494 A1 | 12/2009 | Cottingham et al. | |
| 2010/0205529 A1 | 8/2010 | Butin et al. | |
| 2011/0066470 A1 | 3/2011 | Goyal et al. | |
| 2011/0246880 A1* | 10/2011 | Horton et al. | ............ G06F 3/01 |
| 2013/0117668 A1 | 5/2013 | Joseph et al. | |
| 2015/0277727 A1* | 10/2015 | Jemiolo et al. | ......... G06F 17/22 |
| 2017/0034578 A1* | 2/2017 | Patel et al. | ........... H04N 21/454 |
| 2018/0063580 A1* | 3/2018 | Wittke | ................. H04N 21/443 |

FOREIGN PATENT DOCUMENTS

WO       2010033032 A1    3/2010

OTHER PUBLICATIONS

Marcussen, et al., "Context-Awareness and Real-Time Information in an Intelligent Smartphone Application", In Proceedings of 12th International Conference on Innovative Internet Community Systems. Lecture Notes in Informatics, vol. 204, Apr. 19, 2012, pp. 48-58.

* cited by examiner

*Primary Examiner* — James J Debow
(74) *Attorney, Agent, or Firm* — Workman Nydegger (57) ABSTRACT

Described are methods, systems, and computer program products for providing context aware guidance for an application during runtime. Context aware guidance is determined based upon user context and application context. User context includes a security role and a lifecycle stage. Context aware guidance includes steps which are rendered in runtime on a application based on the user and application context.

20 Claims, 12 Drawing Sheets

CONTEXT AWARE GUIDED SCENARIOS

CROSS REFERENCE TO RELATED APPLICATIONS

This application claims priority under 35 U.S.C. § 119 to Indian Patent Application No. 201741000144, filed Jan. 2, 2017, the entire disclosure of which is hereby incorporated herein by reference.

BACKGROUND

Computers and computing systems are ubiquitous and have affected nearly every aspect of modern living. Computers are commonly involved in work, commerce, recreation, healthcare, transportation, entertainment, household management, any myriad other areas. Learning to use the often complex software hosted upon computers, hosted on computer networks, and hosted in cloud computing environments can sometimes be difficult and problematic.

Previous interactive help and training systems can provide general assistance or help for particular aspects of existing applications. However, existing training systems may not, while providing guidance for a particular user for a particular application, take into account the role or security privileges of a particular user, may not take into account a lifecycle stage of a user or application, and may not take into account the context of the underlying application.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method that may be practiced in a computing environment. The method includes acts for providing context-aware guidance that can serve as in-app guidance and a training platform for applications. Depending on a user context (including a security role and lifecycle stage) and an application context, a user may be provided a guidance and engagement platform that guides and trains the user through guided scenarios that are relevant to the user context and application context. It may provide users with an interactive scenario walkthrough experience that helps users learn the functionality and realize the value of the application product. Embodiments herein can provide users with interactive guided scenario experiences relevant to an application product that is relevant to their workflow, at a time when they are most receptive to learning application functionality that they may not have expected or discovered on their own, thus further enhancing their knowledge of application functionality and helping users to realize the value of the application product.

The method for providing context-aware guidance may include receiving a request to initiate guidance for an application. The method may also include identifying a user context, identifying an application context, and identifying a lifecycle stage associated with the user. Based upon the user context, application context, and lifecycle stage, guidance content may be determined. The guidance context may comprise one or more steps which provide in-app guidance to the user for the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In the following description and examples, computer systems, cloud services, and distributed services are illustrated, but it should be appreciated that other embodiments, including on-premises systems or hybrid systems including cloud elements in combination with on-premises components, may employ particular aspects of embodiments of the invention as illustrated herein.

Embodiments presented herein comprise methods, systems, and computer program products for providing context-aware guidance that can serve as in-app guidance and a training platform for applications. Context aware guided scenarios can help users discover and learn how to use the application product based on the user context. Context aware guided scenarios can offer new and guided scenarios to users for training and customer care based on the user context and application context. Context aware guided scenarios can provide an interactive way for users to discover and learn about an application or software product that is truly relevant to their workflow, when they are most receptive to learning things that they may not have expected or discovered on their own.

Embodiments presented herein can provide benefits over previous application assistance products and methods. For instance, embodiments described herein take into consideration multiple aspects of context: a user context (with security role privileges), a lifecycle stage associated with a user, an application context, a particular application state, a guided scenario version, user progress within an application, etc., as discussed further below for performing the selection of guided scenarios from sets of guided scenarios and then actually rendering a selected guided scenario in during application runtime. Also, in spite of just letting the user to discover how to use an application, embodiments described herein provide an engagement platform that can be used for training materials for different users through guided scenarios that are customized for and relevant to a particular user and user context.

One embodiment illustrated herein includes a computer implemented method that may be practiced in a computing environment. The method includes acts for providing context-aware guidance that can serve as in-app guidance and a training platform for applications. Depending on a user context (including a security role and lifecycle stage) and an application context, a user may be provided a guidance and engagement platform that guides and trains the user through guided scenarios that are relevant to the user context and application context. It may provide users with an interactive scenario walkthrough experience that helps users learn the functionality and realize the value of the application product. Embodiments herein can provide users with interactive guided scenario experiences relevant to an application product that is relevant to their workflow, at a time when they are most receptive to learning application functionality that they may not have expected or discovered on their own, thus further enhancing their knowledge of application functionality and helping users to realize the value of the application product.

The computer implemented method for providing context-aware guidance may include receiving a request to initiate guidance for an application. The method may also include identifying a user context, identifying an application context, and identifying a lifecycle stage associated with the user. Based upon the user context, application context, and lifecycle stage, guidance content may be determined. The guidance context may comprise one or more steps which provide in-app guidance to the user for the application.

Another embodiment may comprise a system that can provide context-aware guidance that can serve as in-app guidance and a training platform for applications. The system may comprise one or more computer processors and durable data storage wherein data and computer executable instructions may be stored. The computer executable instructions, when executed upon the one or more computer processors, may cause the system to perform a method which includes acts for providing context-aware guidance which can serve as in-app guidance and a training platform for applications. The method for providing context-aware guidance may include receiving a request to initiate guidance for an application. The method may also include identifying a user context, identifying an application context, and identifying a lifecycle stage associated with the user. Based upon the user context, application context, and lifecycle stage, guidance content may be determined. The guidance context may comprise one or more steps which provide in-app guidance to the user for the application.

Another embodiment may comprise a computer program product for providing context-aware guidance that can serve as in-app guidance and a training platform for applications. The computer program product may comprise data storage media or devices which store computer executable instructions. The computer executable instructions, when executed upon one or more computer processors within a computing system, may cause the system to perform a method which includes acts for providing context-aware guidance which can serve as in-app guidance and a training platform for applications. The method for providing context-aware guidance may include receiving a request to initiate guidance for an application. The method may also include identifying a user context, identifying an application context, and identifying a lifecycle stage associated with the user. Based upon the user context, application context, and lifecycle stage, guidance content may be determined. The guidance context may comprise one or more steps which provide in-app guidance to the user for the application.

Figure 1:
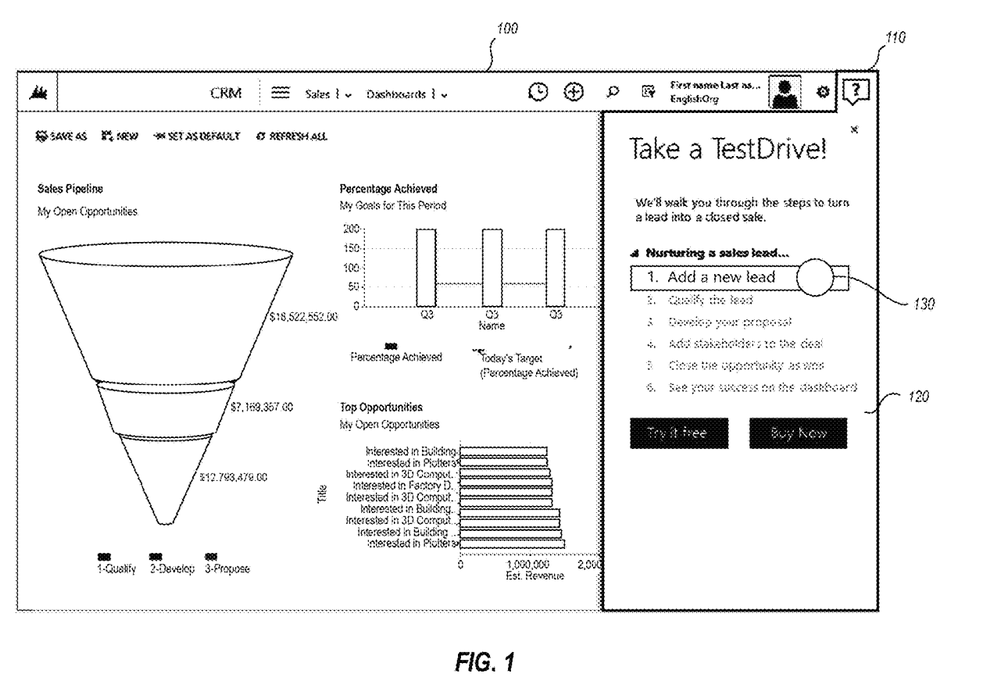
FIG. 1 illustrates an example of a sidebar for context aware guided scenarios.

FIG. 1, for example, illustrates an application user interface displaying particular aspects as may be implemented in particular embodiments described herein. For instance, FIG. 1 illustrates a user interface (UI) 100 for a particular Customer Relationship Management (CRM) application. Embodiments herein may impose an overlay of a help button 110 onto the UI. When the help button is pressed, a sidebar 120 is displayed which further overlays upon the UI. In this example, the sidebar suggests and allows a user to "Take a Test Drive" of the CRM application. (It should be noted that, although a CRM application is illustrated in the example and in the figures, the application for which guided scenarios is implemented need not be a CRM application or any other particular application. Context aware guided scenarios may be implement for any application whatsoever. Applications may include, but not limited to, word processors, spreadsheets, CRM applications, video editing, databases, image editing, mathematical and statistical applications, technical and engineering applications, computer aided design (CAD) applications, etc.)

Figure 2:
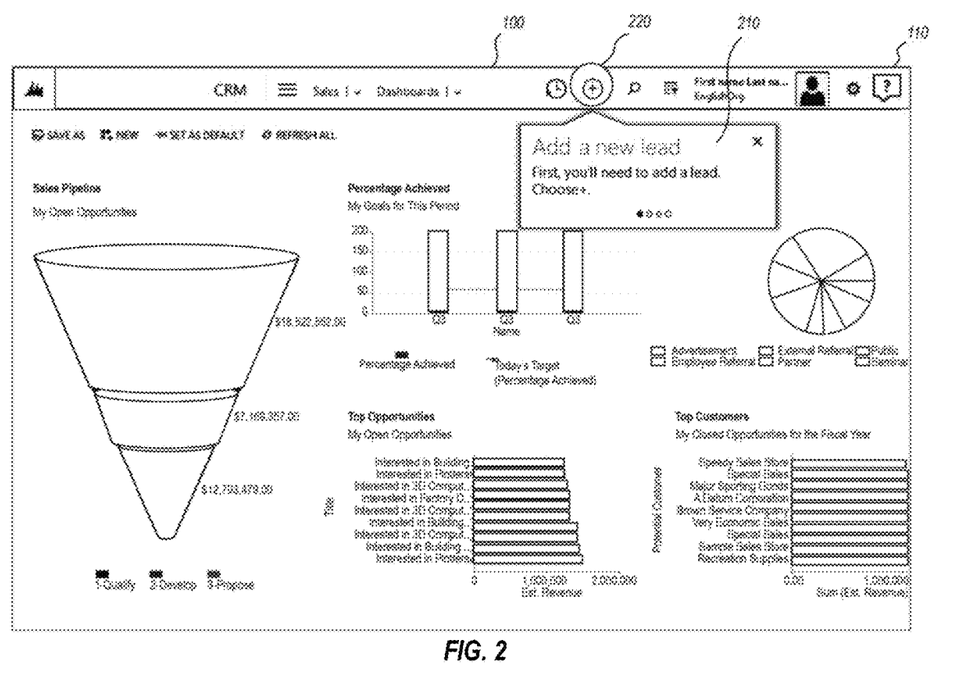
FIG. 2 illustrates an example of a step of a guided scenario.

In the sidebar 120, the user can select a particular guided scenario. In this example, there are six scenarios illustrated. The user may be guided to select the first scenario, "Add a new lead" 130. In response to selecting the "Add a new lead" 130 scenario, as illustrated in FIG. 2, a flyout user interface overlay 210 can be generated and rendered onto the application UI 100. The first step in the "Add a new lead" scenario instructs the user to "Choose+" and the "+" button in the original application UI is highlighted 220 for the user. It may be noted that the "Choose+" step is only one of possibly many steps in the scenario. In this example, a visual progress indication 230 of four dots indicates that there are four steps in the scenario and this is the first step of the four steps. (This is indicated by the first dot being solid with the remaining three dots being open.) The indication of how many steps there are and which particular step the user is on need not be represented by dots, as in this example, but may be any other indication as those will skill in the art may appreciate.

Figure 3:
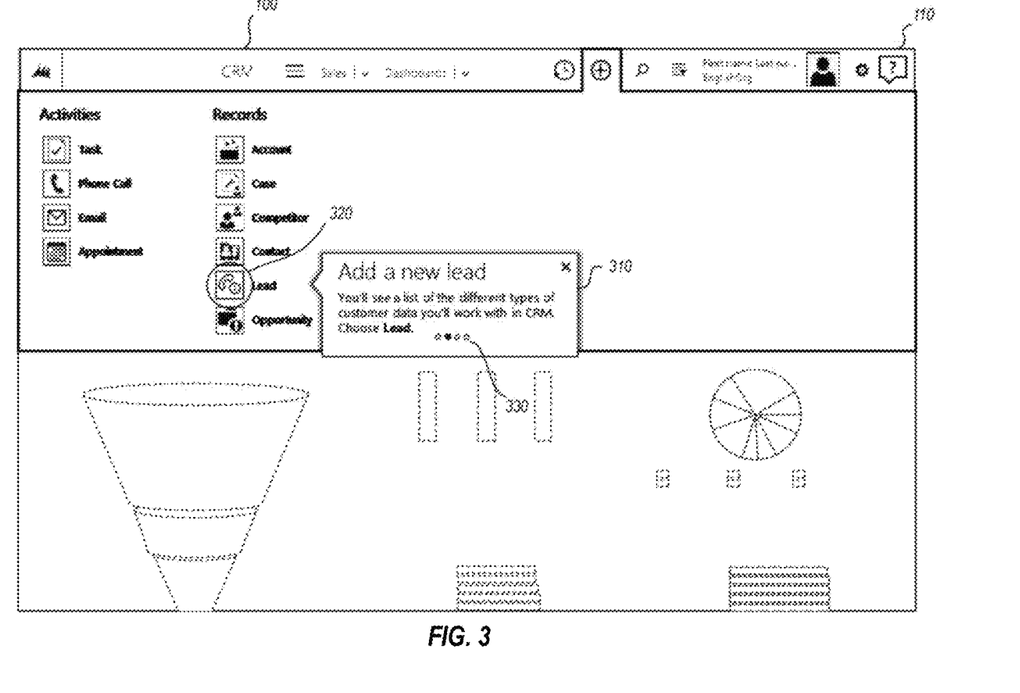
FIG. 3 illustrates an example of a step of a guided scenario.

As illustrated in FIG. 3, when a user actually selects as was prompted by the instruction flyout 220, the "+" option in the application UI, the guided scenario detects this selection and automatically advances to the next step of the scenario. In this case, step two of the scenario renders a flyout 310 which instructs a user to choose the "Lead" control 320 of the application UI. The progress indication 330 has also changed, with the second of the four dots now solid, to indicate that now the user is on step 2 of the four step "Add a new lead" scenario.

In this fashion, a guided scenario can lead, suggest, and instruct a user through a series of steps in order to guide the user through an applications functionality during runtime. Further, the guided scenarios are generated for particular tasks, such as "Add a new lead" which may be relevant to users with particular roles, such as a sales agent and with particular security roles or privileges. This step is an "active" step where the user clicking on the intended target in this case the "Lead" control completes the action within the application on behalf of the user (and advances to the next step).

Figure 4:
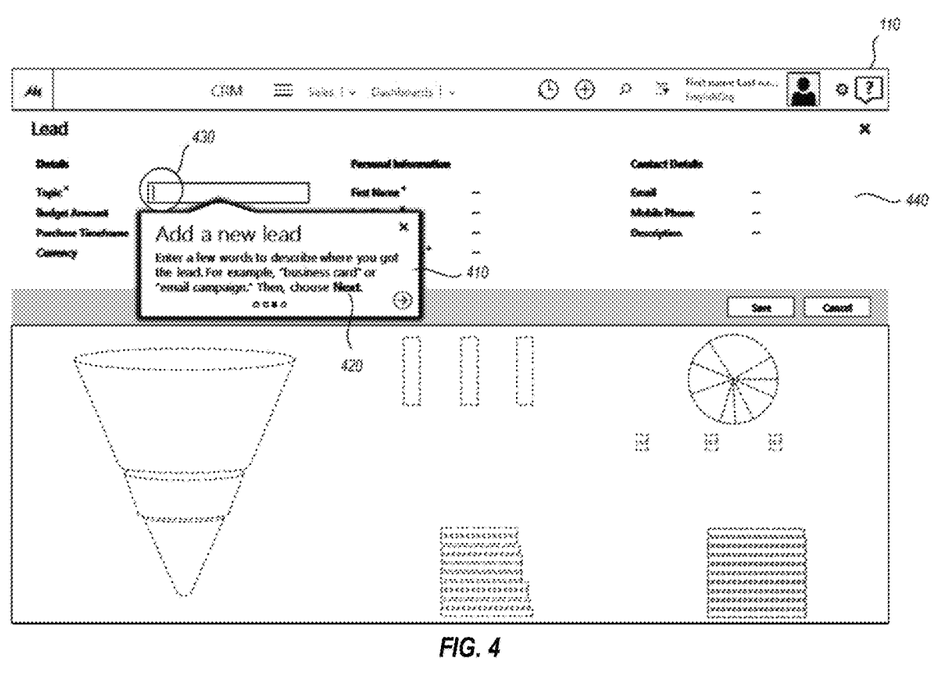
FIG. 4 illustrates an example of a step of a guided scenario.

As illustrated in FIG. 4, when a user has clicked on the "Lead" control 320 of the underlying application, the application responds by presenting the window pane 440 (as it normally would even without the guided scenario steps) and the guided scenario progresses to step 3 of the scenario. In this case, step 3 renders a flyout overlay 410 onto the application includes instruction to enter a description of the topic and highlights 430 the text box where it is appropriate for the user to enter text. The step waits for the user to enter the appropriate text into the application's text box 430. This step is a "waiting" step which waits for the user to enter input onto a form or text input control of the underlying application. In this waiting step, the scenario waits to advance to the next step until the user selects the "next" control 420 within the flyout 410.

Figure 5:
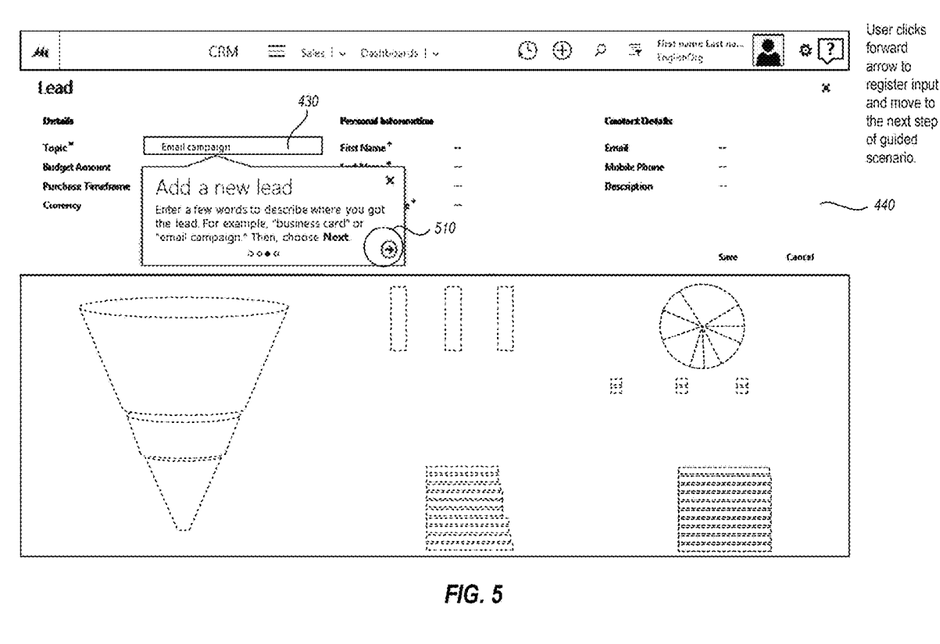
FIG. 5 illustrates an example of a step of a guided scenario.
Figure 6A:
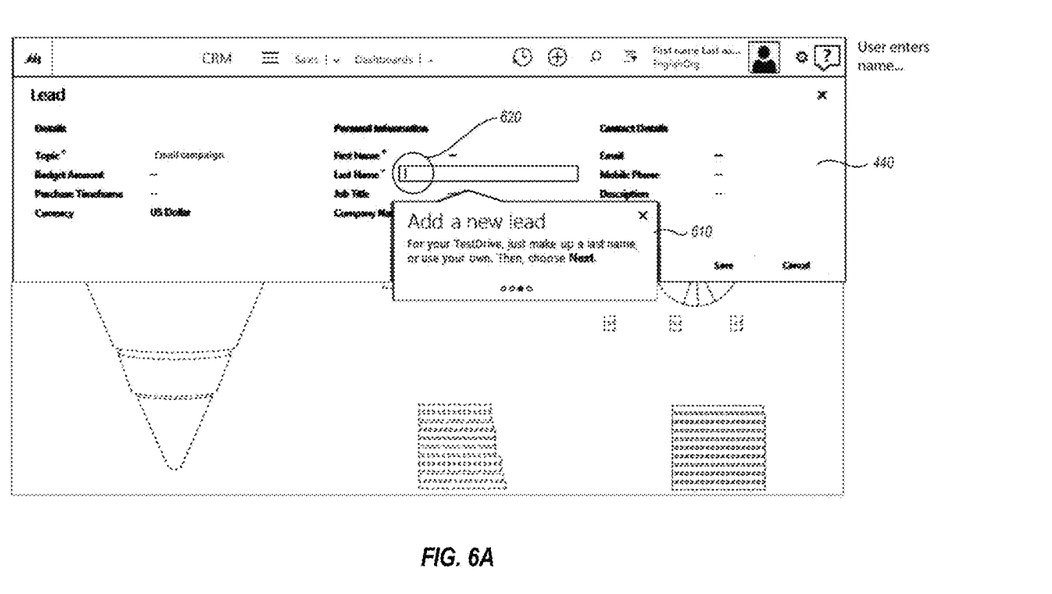
FIG. 6A illustrates an example of a step of a guided scenario.
Figure 6B:
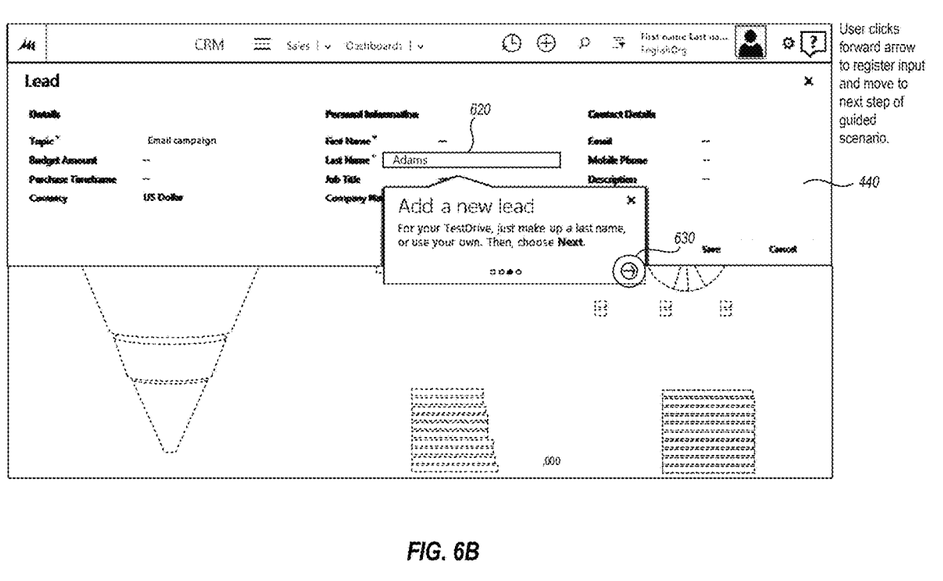
FIG. 6B illustrates an example of a step of a guided scenario.

As in FIG. 5, the user might enter "Email campaign" into the text box 430 and the guided scenario may indicate that it is now appropriate to choose next or the "advance step" arrow 510. When the user chooses "next," the scenario advances and, as in FIG. 6A, a new flyout overlay 610 instructs the user to enter a last name and highlights the appropriate text box 620 for entering the input. As illustrated in FIG. 6B, when the user has entered appropriate text (e.g., "Adams") in the text box 620, the guided scenario then indicates 630 that it would be appropriate for the user to select "Next" or the advance arrow 630.

Figure 7:
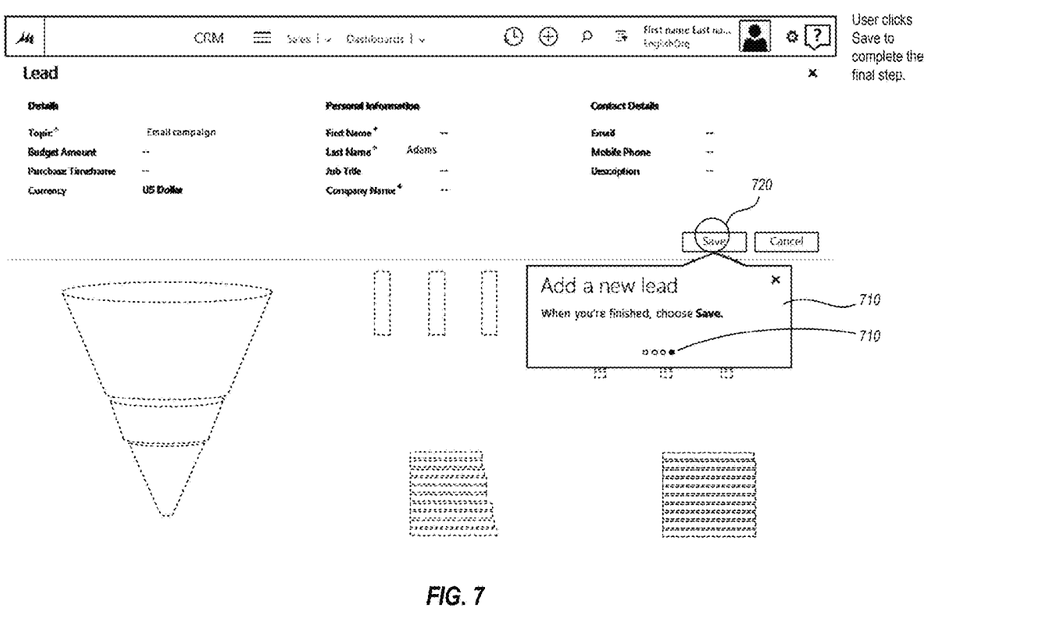
FIG. 7 illustrates an example of a step of a guided scenario.

As illustrated in FIG. 7, when the user selects the advance arrow 630 (or "Next"), the guided scenario advances to the fourth step and presents a new flyout overlay 710 which instructs the user that to complete the task and "Add a new lead" he should click on the application's "Save" control. The guided scenario highlights 720 the save control to guide the user to the proper button. The progress indicator 730 also indicates that this is the last (4th of four) step in the "Add a new lead" guided scenario.

Figure 8:
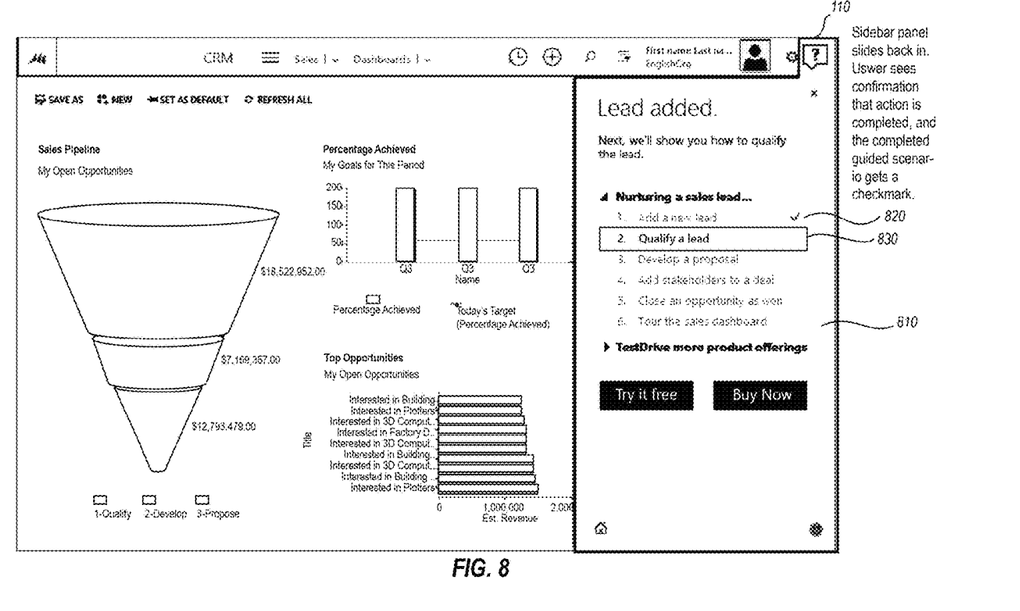
FIG. 8 illustrates an example of a sidebar for context aware guided scenarios.

When the user clicks on "Save," then, as illustrated in FIG. 8, the guided scenario is now complete and the sidebar 810 slides back in to overlay the application UI. At this stage, the sidebar now indicates that the first scenario, "Add a new lead," is now complete by the indication with a checkmark 820. The sidebar also now indicates 830 that the second scenario, "Qualify a lead," is now appropriate to select.

A user could then progress, selecting and completing each guided scenario, until each scenario is complete. Alternatively, a user could stop his progress at any point and then resume at this or another point at some time in the future. Resuming where a user left off is enabled by the context aware guided scenarios using a user context and an application context to, among other things, record the progress state within the application and within the guided scenarios so that a user could resume progress at the point at which he previously suspended.

Figure 9:
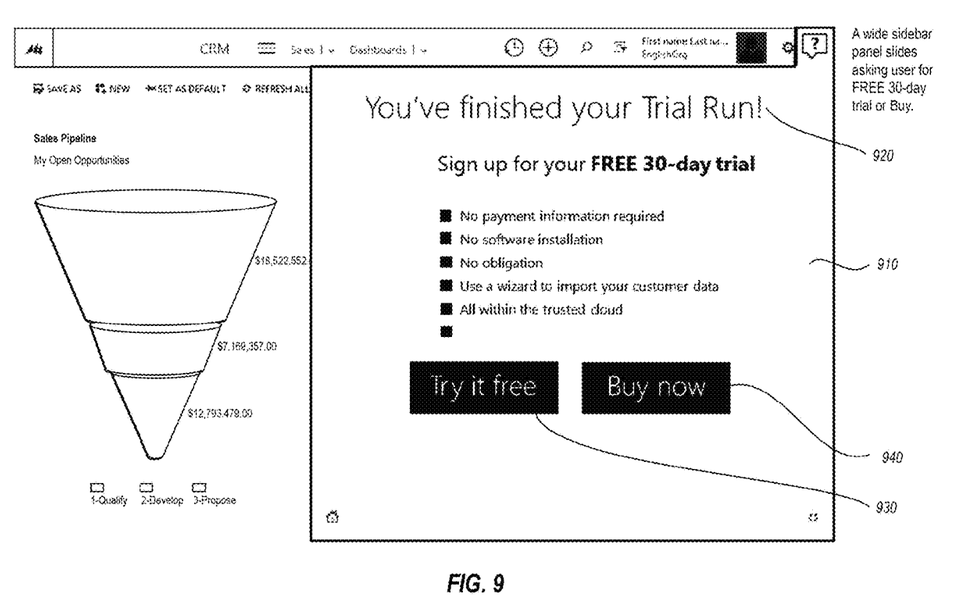
FIG. 9 illustrates an example of a sidebar for context aware guided scenarios.

As illustrated in FIG. 9, at a time that all the scenarios in a guided scenario are completed, a new sidebar 910 may be rendered and presented which indicates the completion 920 of the set of guided scenarios and present additional options. In this example, the set of guided scenarios were intended for a trial run for a new user of an application. The sidebar indicates that the trial run has completed 920 and presents controls which, when selected, allow a user to perform additional functions. In this example, a user could select a button 930 to try the underlying application for free or a button 940 to immediately buy the application.

As illustrated in the examples and figures, above, a step of a guided scenario may include, among others, each of:
  an Active Step: a step with a user action an action step is defined as the overlay where clicking completes an action within the application on behalf of the user;
  a Passive Step: a step with a next action a next action step is defined where a user click just advances to the next step of the scenario but otherwise does not perform an action within the underlying application;
  a Hybrid Step: is a combination of both Active and Passive step where the click advances to the next step as well as the click completes an action within the application on behalf of the user; and
  a Waiting Step: a waiting step waits for the user to complete associated tasks by providing user inputs to a form or text input of the application to which the step is associated before advancing to the next step.

It should be noted that the guided scenarios presented to a user are context aware. Being context aware includes the scenarios being presented to a user are customized and particular for a particular user and particular context. A context may include both a user context and an application context (app context). A user context, in turn, may include, among other information and data, a security role and a lifecycle state.

Security role: A user of an application may be assigned certain security role privilege. Depending on the application, a user can have different security roles, for example Business Manager, Customer Service Representative, CSR Manager, Marketing Manager, Sales Manager, Salesperson, System Administrator, System User, Vice President of Marketing, Vice President of Sales, etc. A security role may also include security and access credentials of a user. For example, a particular user may have access to certain data but not to other data and may have access to certain application functionality but not to other functionality. A user's security role data may be received and used by a context aware guided scenario manager to customize the guided scenarios presented to a particular user.

Lifecycle stage: A lifecycle state for a user may include each of:

a) trial run (which may identify and be applicable to guest or trial users of an application,
b) first run (which may identify and be applicable to a new paid user of an application), and
c) advanced run (which may identify and be applicable to a paid and/or a seasoned or experienced user of an application).

A lifecycle stage may also include data indicating the progress a user has made through an application or a previously begun but not yet completed guided scenario such that a user can resume the previously begun but not yet completed guided scenario.

An application context may include an application version, a particular page URL or location within the application, and a particular platform or form factor such as the application being currently rendered on a Desktop PC, Tablet, a SmartPhone, or other computing platform.

In some embodiments, content is saved using a content object data model. When content is authored for any control of a Guided Scenario, a User Context and App context may be saved along with the content (such as HTML) using a Content Object Data Model in a database. A Content object data model may specify a model and format in which content data objects are created and stored in a service database.

In one embodiment, a Content Object Data Model object may comprise the following attributes:
   a) state—represents the "state" of the application. It is up to the individual application to define what state represents for that application. For example, for a particular application a page URL can represent the state for that application;
   b) appcontext—represents application specific attributes and its context;
   c) content—the content, such as html, for a given application state, which is used by the application renderer to render the application page;
   d) contentversion—represents the version of the content-Data;
   e) userroleInfo—represents user's related information and its relevant role privileges; and
   f) lifecycle stage—represents the lifecycle stage value of the user at any point of time inside the application.

An example Content Data Object Model can be represented as:

```
ContentData Object {
    state,
    appcontext,
    htmlcontent,
    contentversion,
    userroleInfo,
    lifecycle stage
}
```

Figure 10:
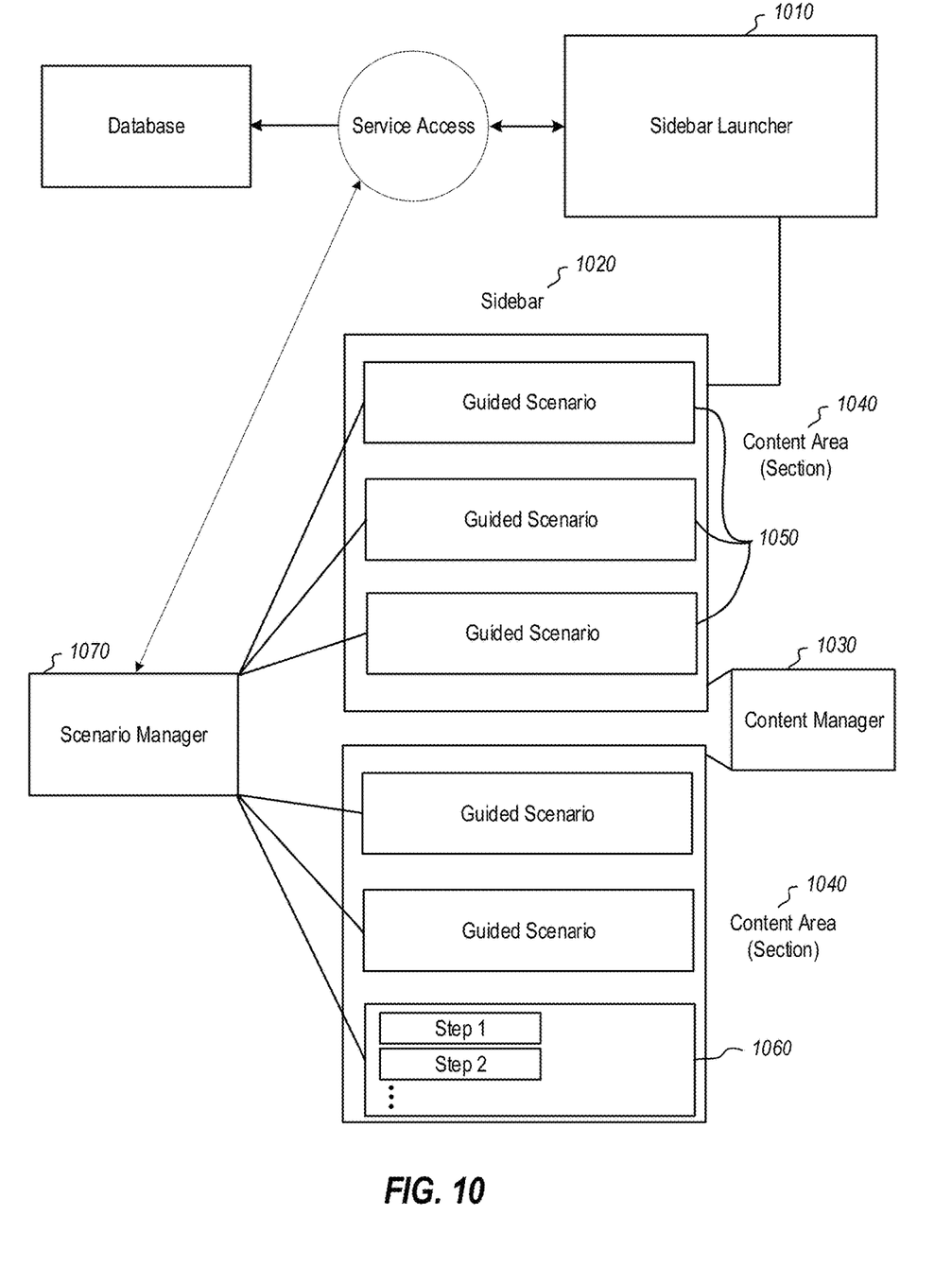
FIG. 10 illustrates a block diagram for an architecture for context aware guided scenarios.

Content for context aware guided scenarios may be authored using a designer for sidebars, steps, and guided scenarios. Controls may be rendered using a template (such as fully formed HTML) and data (such as JSON). A context aware guided scenario may be retrieved from service and rendered in runtime using an architecture as illustrated in FIG. 10.

Embodiments as described herein, may implement a sidebar launcher 1010, a sidebar 1020, one or more steps 1060, one or more guided scenarios 1050, and sections (i.e., content areas) 1040.

A sidebar launcher 1010 is used to invoke the Sidebar 1020, which provides a user with contextual help content relevant to the user's context. Sidebar launcher control 110 in FIG. 1 illustrates an example of a rendered control which, when selected, will invoke the sidebar launcher 1010. A SideBar launcher initializes a sidebar which in turn initializes sections to render all the content areas hosted inside a sidebar. A sidebar may be an overlay panel that offers relevant Guided Scenarios to the user, based on the user's context. Sidebar 120 of FIG. 1 is an example of a sidebar that slides in on the right side of the app. Sidebars 810 and 910 are other examples of sidebars. A sidebar can slide (or otherwise overlay) a modal panel onto the UI of an application and display to a user content with relevant in-app training. The content rendered and displayed is based on the user context and app context. The sidebar, when rendered on the app UI, does not affect the app content and is rendered as an overlay. The sidebar renders a sidebar template (such as html) and initializes sections with guided scenario children's view to implement hosted controls.

Content Manager 1030 is responsible for initializing controls hosted in a sidebar and return the complete html to be rendered inside sidebar.

A Section (Content Area) 1040 is a container for list of scenarios. A section is a content area inside a Sidebar that lets a user pick from a list of Guided Scenarios. A section may also include text or graphics and may be active accepting and acting on user input, or passive, merely presenting text or graphical information. Each of the six listed scenarios in FIGS. 1 and 8, as well as the titles and action buttons 930 & 940 in FIG. 9 are examples of sections. A section can include a checkmark when completed (as illustrated by checkmark 820 in FIG. 8).

Steps 1060. A step is a flyout that overlays on an app UI with text to help a user discover and learn how to use the app.

A step can be a templatized flyout that overlays on an application UI with text and graphics to help the user discover and learn how to use the application. Steps may be of types (and as discussed above):
   i) a step with user action defined as an overlay where clicking completes an action on behalf of the user; and
   ii) a step with a next action defined a where the click just advances to the next step.

As discussed, above, a step of a guided scenario may include, among others, each of:
   an Active Step: a step with a user action an action step is defined as the overlay where clicking completes an action within the application on behalf of the user;
   a Passive Step: a step with a next action a next action step is defined where a user click just advances to the next step of the scenario but otherwise does not perform an action within the underlying application;
   a Hybrid Step: is a combination of both Active and Passive step where a click advances to the next step as well as the click completes an action within the application on behalf of the user; and
   a Waiting Step: a waiting step waits for the user to complete associated tasks by providing user inputs to a form or text input of the application to which the step is associated before advancing to the next step.

Guided Scenarios 1050 keep track of the order of Steps within a scenario. A guided scenario can be collection of multiple steps. As illustrated in FIGS. 1-7, the steps of an "Add a new lead" guided scenario may include a "Choose+" step (FIG. 2), a "Choose Lead" step (FIG. 3), an "enter topic" step (FIG. 4), an "enter last name" step (FIG. 6), and a finish "save" step (FIG. 7).

A Scenario Manager 1070 handles guided scenarios hosted inside the sidebar and handles the launch and navigation through various steps in a guided scenario. The Scenario Manager 1070 can be responsible for Displaying relevant steps of a guided scenario on click of scenario on sidebar;

Keeping track of the number of steps completed in a scenario;

Displaying next or previous step on click of next or previous buttons, respectively, at any step;

Display next step when an expected action (like a click etc) is completed by user;

Handling across page scenarios: save the state, call navigation APIs exposed by app context object and display the relevant step; and On completion of a scenario, update the sidebar with a tickmark indicating completion.

Embodiments described herein may be implemented using control libraries including client side controls including a sidebar launcher, sidebar, step, guided scenario, and section. The controls in the control library can be templatized and re-usable by other scenarios and application products.

In particular embodiments, behavior of context aware guided scenarios may include:

a) A Guided Scenario shows all steps contained within it on user clicking next and/or previous of a Step or on performing another user action.

b) For a first step in a guided scenario, there is no previous and for the last step, there is no next step. A last step may have "done" or "got it" instead of next.

c) Guided scenarios can be resumeable, i.e, if a user leaves a Guided scenario in progress in the middle of a step as incomplete, then clicking that Guided scenario from the Sidebar resumes the Guided scenario from that particular step where the user was last.

d) After completing a Guided scenario, it is recorded and indicated in the Sidebar as having been completed. This may be done, for example, by rendering a checkmark associated with the completed scenario.

e) A Scenario Manager may track user interactions both per sessions and across sessions to record and show progress.

f) A system user (guest user) whose lifecycle stage is "Trial Run," will view the guided scenarios content applicable for its user context and lifecycle stage. If the user completes all of its guided scenarios, user will be given an option to buy the underlying application product. If the user buys the product, the user's lifecycle stage is changed to First Run.

g) For a user whose lifecycle stage is First Run, that user will see the guided scenarios content applicable for its security role context and lifecycle stage.

h) If the lifecycle stage of a user is First Run and the user has completed all the Guided Scenarios for its context, then the lifecycle stage of the user is changed to Advanced Run. Next time the user logs into the application, he will see new set of Guided Scenarios corresponding to its updated user context and updated lifecycle stage.

The following discussion now refers to methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
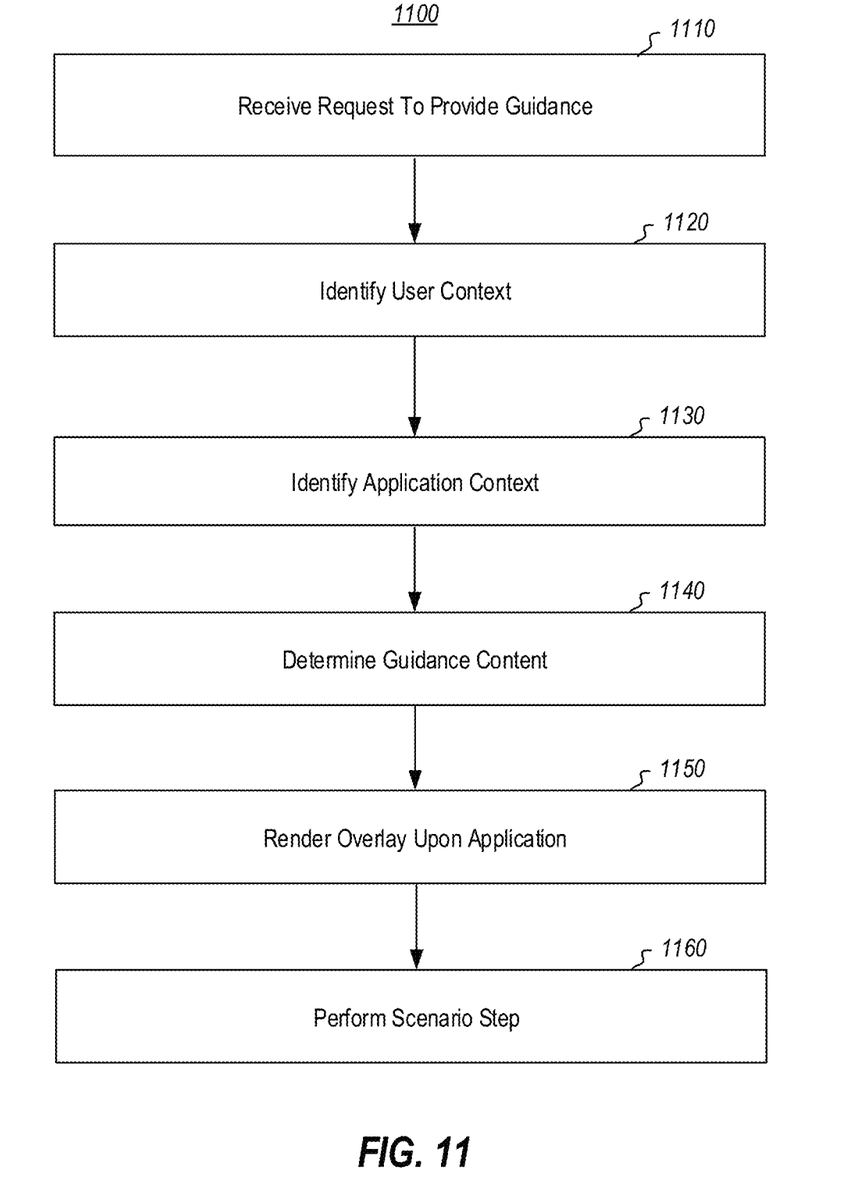
FIG. 11 illustrates an example flow diagram for a method for context aware guided scenarios.

Referring now to FIG. 11, a method 1100 is illustrated. The method 1100 may be practiced in a computing environment, such as a cloud computing environment, an on-premises environment, or a hybrid of the two. The method includes acts for providing context aware guidance for an application during runtime.

The method 1100 may include receiving a request 1110 to initiate guidance for an application.

The method 1100 may further include identifying a user context 1120. The user context may comprise a security role. The user context may comprise a lifecycle stage that is one of a trial run, a first run, or an advanced run.

The method 1100 may further include identifying an application context 1130. The application context may comprise at least one of an application version or an application state.

The method 1100 may further include identifying a lifecycle stage associated with the user.

The method 1100 may further include determining guidance content 1140 (e.g., data or information) based upon the user context, application context, and lifecycle stage, the guidance context comprising one or more steps. The steps may include at least one of an active step, a passive step, a hybrid step, or a waiting step. A step may include a templatized flyout that overlays on an application UI to help a user learn how to use the application. The steps may be one or more of an active step, a passive step, a waiting step, or a hybrid step.

The method 1100 may further include rendering an overlay 1150 upon the application associated with the guidance content. The overlay may comprise a sidebar. A sidebar may comprise sections (e.g., panels) allowing a user to select from a plurality of guided scenarios The method may also invoke a sidebar launcher.

The method 1100 may also include performing 1160 at least one of the one or more steps within the application at runtime.

Further, the methods may be practiced by a computer system including one or more processors and computer-readable media such as computer memory and computer storage devices. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM, other optical disk storage devices (such as CDs, DVDs, etc), magnetic disk storage, magnetic tape storage, other magnetic storage devices, or any other physical medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for providing context aware guidance for an application during runtime, the method comprising executing computer-executable instructions which cause a computing system to perform the method comprising:
    receiving a request to initiate guidance for an application;
    identifying a user context;
    identifying an application context;
    identifying a user's progress within the application;
    identifying a lifecycle stage associated with the user, a lifecycle stage value indicating the user's skill with the application and distinguishing at least between a first time user and an advanced user of the application;
    determining guidance content based upon the user context, the application context, the user's progress within the application, and the lifecycle stage, the guidance content comprising one or more steps;
    rendering an overlay upon the application associated with the guidance content; and
    performing at least one of the one or more steps within the application at runtime.

2. The method of claim 1 wherein the steps comprise at least one of an active step, a passive step, a hybrid step, or a waiting step.

3. The method of claim 1 wherein the user context comprises a security role or a lifecycle stage.

4. The method of claim 1 wherein the user context comprises a lifecycle stage that is one of a trial run, a first run, or an advanced run.

5. The method of claim 1 wherein the application context comprises at least one of an application version, an application state, or an application form factor.

6. The method of claim 1 wherein the overlay comprises a sidebar.

7. The method of claim 1 wherein the sidebar comprises panels allowing picking from multiple guided scenarios.

8. The method of claim 1 wherein the method includes a sidebar launcher.

9. The method of claim 1 wherein a step includes a templatized flyout that overlays on the application UI to help the user learn how to use the application.

10. A system for providing context aware guidance for an application during runtime, the system comprising one or more computer processors and durable data storage having stored therein computer executable instructions which, when executed upon the one or more computer processors, cause the system to perform a method comprising:
    receiving a request to initiate guidance for an application;
    identifying a user context;
    identifying an application context;
    identifying a user's progress within the application;
    identifying a lifecycle stage associated with the user, a lifecycle stage value indicating the user's skill with the application and distinguishing at least between a first time user and an advanced user of the application;
    determining guidance content based upon the user context, the application context, the user's progress within the application, and the lifecycle stage, the guidance content comprising one or more steps;

rendering an overlay upon the application associated with the guidance content; and performing at least one of the one or more steps within the application at runtime.

11. The system of claim 10 wherein the steps comprise at least one of an active step, a passive step, a hybrid step, or a waiting step.

12. The system of claim 10 wherein the user context comprises a security role or a lifecycle stage.

13. The system of claim 10 wherein the user context comprises a lifecycle stage that is one of a trial run, a first run, or an advanced run.

14. The system of claim 10 wherein the application context comprises at least one of an application version, an application state, or an application form factor.

15. The system of claim 10 wherein the overlay comprises a sidebar.

16. The system of claim 10 wherein the sidebar comprises panels allowing picking from multiple guided scenarios.

17. A computer program product for providing context aware guidance for an application during runtime, the computer program product comprising one or more computer readable data storage devices having stored therein computer executable instructions which, when executed upon one or more computer processors, cause the one or more computer processors to perform a method comprising:

receiving a request to initiate guidance for an application;

identifying a user context;

identifying an application context;

identifying a user's progress within the application;

identifying a lifecycle stage associated with the user, a lifecycle stage value indicating the user's skill with the application and distinguishing at least between a first time user and an advanced user of the application;

determining guidance content based upon the user context, the application context, the user's progress within the application, and the lifecycle stage, the guidance content comprising one or more steps;

rendering an overlay upon the application associated with the guidance content; and performing at least one of the one or more steps within the application at runtime.

18. The computer program product of claim 17 wherein the steps comprise at least one of an active step, a passive step, a hybrid step, or a waiting step.

19. The computer program product of claim 17 wherein the user context comprises a security role or a lifecycle stage.

20. The computer program product of claim 17 wherein the user context comprises a lifecycle stage that is one of a trial run, a first run, or an advanced run.

* * * * *